United States Patent
Santos

(10) Patent No.: US 11,095,588 B2
(45) Date of Patent: Aug. 17, 2021

(54) SOCIAL NETWORK DATA PROCESSING AND PROFILING

(71) Applicant: ACCENTURE GLOBAL SOLUTIONS LIMITED, Dublin (IE)

(72) Inventor: Renee Ross Barrientos Santos, Taguig (PH)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/654,715

(22) Filed: Oct. 16, 2019

(65) Prior Publication Data

US 2021/0119951 A1   Apr. 22, 2021

(51) Int. Cl.
*H04L 12/58* (2006.01)
*G06Q 50/00* (2012.01)
*G06F 40/284* (2020.01)

(52) U.S. Cl.
CPC ............ *H04L 51/12* (2013.01); *G06F 40/284* (2020.01); *G06Q 50/01* (2013.01); *H04L 51/20* (2013.01); *H04L 51/32* (2013.01)

(58) Field of Classification Search
CPC .......... H04L 51/10; H04L 51/12; G06Q 50/01
See application file for complete search history.

(56) References Cited

U.S. PATENT DOCUMENTS

| 2012/0028606 A1* | 2/2012 | Bobotek | H04L 51/28 455/411 |
| 2013/0024407 A1* | 1/2013 | Thompson | G06F 16/353 706/12 |
| 2016/0188597 A1* | 6/2016 | Moore | H04L 51/12 707/749 |
| 2016/0269342 A1* | 9/2016 | Bank | H04L 51/32 |

* cited by examiner

*Primary Examiner* — Esther B. Henderson
(74) *Attorney, Agent, or Firm* — Mannava & Kang, P.C.

(57) ABSTRACT

A social network data processing and profiling system analyzes messages from a plurality of social networks to identify bad content and users posting bad content. The messages analyzed include primary posts and secondary messages which are posted in response to the primary posts. Keywords are initially obtained from the messages via applying content processing techniques. The keywords are used to categorize the messages into one or more of a plurality of categories. Sentiments are extracted from the messages. The messages are scored based at least on the contents and sentiments of the messages in addition to the actions represented by the messages if the messages are secondary messages. Messages with non-zero scores are aggregated to identify trends in the social networks and to identify users posting the messages.

20 Claims, 15 Drawing Sheets

| USER | POST_CONTENT | DATETIME | POST_TOP | PT | POST_SENTIME | PS_CONFIDE | ACTION TYPE | ACTION CONTENT | P | ACTION_SENTIM | AS_CONFIDE | NDR_SCOR |
|---|---|---|---|---|---|---|---|---|---|---|---|---|
| 13 | BULLIES ARE THE WORST | 27-SEP | BULLYING | 94 | POSITIVE | 95 | POST | - | - | - | 91 | 0 |
| 118 | BULLIES ARE THE WORST | 30-SEP | BULLYING | 90 | POSITIVE | 99 | SHARE WITHOUT COMMENT | - | 1 | - | 86 | 0 |
| 109 | BULLIES ARE THE WORST | 3-OCT | BULLYING | 98 | POSITIVE | 96 | REACTION | LIKE | 1 | POSITIVE | 99 | 0 |
| 68 | BULLIES ARE THE WORST | 6-OCT | BULLYING | 92 | POSITIVE | 98 | REACTION | HEART | 1 | POSITIVE | 97 | 0 |
| 132 | BULLIES ARE THE WORST | 9-OCT | BULLYING | 91 | POSITIVE | 90 | REACTION | WOW | 1 | POSITIVE | 95 | 0 |
| 100 | BULLIES ARE THE WORST | 12-OCT | BULLYING | 94 | POSITIVE | 98 | REACTION | SAD | 1 | NEGATIVE | 99 | 20 |
| 11 | BULLIES ARE THE WORST | 15-OCT | BULLYING | 93 | POSITIVE | 95 | REACTION | ANGRY | 1 | NEGATIVE | 85 | 20 |
| 95 | BULLIES ARE THE WORST | 18-OCT | BULLYING | 85 | POSITIVE | 96 | COMMENT/SHARE WITH COMMENT | POSITIVE COMMENT | 1 | POSITIVE | 97 | 0 |
| 19 | BULLIES ARE THE WORST | 21-OCT | BULLYING | 85 | POSITIVE | 85 | COMMENT/SHARE WITH COMMENT | NEUTRAL COMMENT | 1 | NEUTRAL | 86 | 0 |
| 103 | BULLIES ARE THE WORST | 24-OCT | BULLYING | 92 | POSITIVE | 95 | COMMENT/SHARE WITH COMMENT | NEGATIVE COMMENT | 1 | NEGATIVE | 97 | 30 |

*FIG. 12*

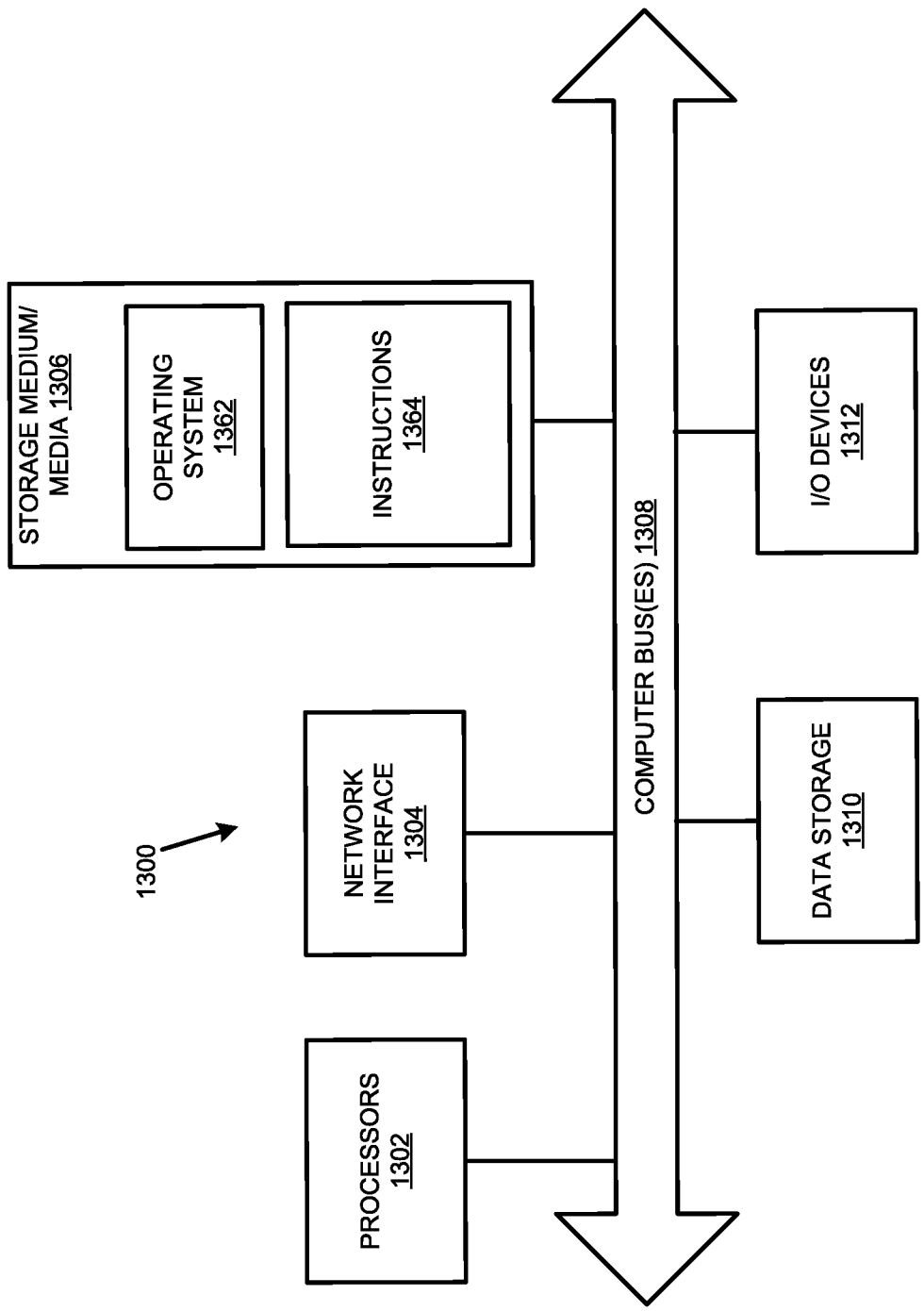

SOCIAL NETWORK DATA PROCESSING AND PROFILING

BACKGROUND

Social networks provide channels for electronic communications through which users can create online communities to exchange information, ideas, personal messages or other content. Users generally access social networks via web-based technologies on devices such as desktops, laptops, smartphones or tablet devices. In contrast to traditional media, social networks provide a channel to exchange information in a dialogic transmission system. Examples of popular social networks include Facebook®, Whatsapp®, Instagram®, YouTube®, WeChat®, Twitter®, Tumblr®, LinkedIn®, Snapchat®, Pinterest®, Viber®, etc. User generated content (UGC) is highly popular on social media. Some of the social media sites enable users to spread the content posted to the websites virally. While enabling users to share or recirculate posted content, the social media sites also need to be cognizant about the dangers posed by bad content and need to employ appropriate tools to control or even prevent the proliferation of bad content.

BRIEF DESCRIPTION OF DRAWINGS

Features of the present disclosure are illustrated by way of examples shown in the following figures. In the following figures, like numerals indicate like elements, in which:

FIG. 12 shows a sample dataset generated by the monitoring system in accordance with the examples disclosed herein.

FIG. 13 illustrates a computer system that can be used to implement the monitoring system in accordance with the examples disclosed herein.

DETAILED DESCRIPTION

Figure 1:
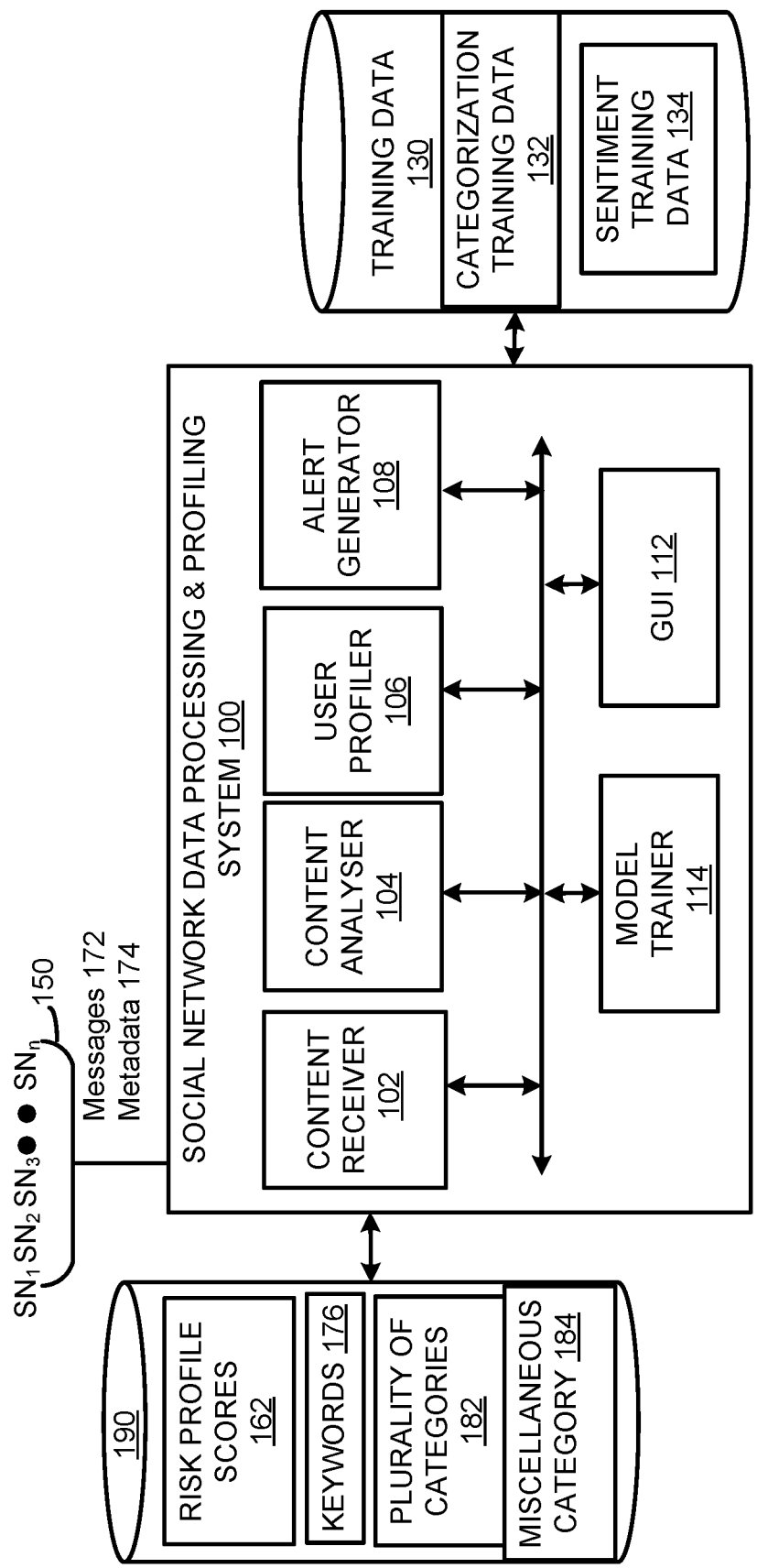
FIG. 1 shows a block diagram of a social network data processing and monitoring system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A social network data processing and monitoring system that accesses messages posted to a plurality of social networks and identifies one or more of bad content and bad actors or potential bad actors is disclosed. The monitoring system disclosed herein receives the messages from the plurality of social networks that allow users to post textual and non-textual content online via the Internet. The messages can include primary posts or primary messages that initially post certain content on the social network application or platform. When a primary message is posted, the social network allows other users to post secondary messages in response to the primary message. The secondary messages convey the reactions or responses of the other users to the content of the primary message. Each of the secondary messages or responses constitutes an action executed by the user posting the secondary message wherein the actions can convey the user's approval or disapproval of the primary message content. The secondary messages can further express various sentiments such as a positive sentiment, a negative sentiment or a neutral sentiment. The monitoring system disclosed herein is configured to analyze the content and the sentiments conveyed in response to the content in the messages and identify bad content and users who are posting the bad content (i.e., the bad actors). Bad content can include content relating to certain topics or certain type of content that is prevented from proliferation via the plurality of social networks. Such content can include but is not limited to content related to topics or categories such as terrorism, abuse, bullying, or illegal activities as may be defined by the local laws.

The messages are processed by employing content processing techniques to extract keywords. The keywords are employed to identify one of a plurality of categories which relate to topics associated with the bad content as described herein. In an example, if the keywords are not relevant to any of the plurality of categories, the messages can be approved without further processing. If one or more of the messages can be categorized into at least one category of a plurality of categories, the sentiments associated with the one or more messages are extracted. In an example, different Artificial Intelligence (AI) models are trained and employed for tasks such as message categorization and sentiment extraction. In an example, a multiclass logistic regression based AI model is trained via supervised learning for content categorization. In an example, a multiclass neural network is trained via supervised learning for sentiment extraction. If the AI confidence is medium then, the training data can be manually tagged and fed to the AI model for continuous AI retraining.

The messages are scored based on one or more of the message content and message sentiment in addition to an action associated with the message if the message is a secondary message. In an example, the messages are given whole number scores so that those messages which need not be analyzed or profiled are given a score of zero whereas the messages likely to include bad content are given non-zero whole number scores. In an example, the messages can also be scored based on a position or status of the messages in the corresponding message chains with the primary messages receiving higher scores than the secondary messages. The messages which receive non-zero scores and users posting the messages that receive non-zero scores are monitored. In an example, the users receive risk profile scores wherein the non-zero scores of the messages posted by the users are aggregated into the corresponding user profiles. When a risk profile score of a user increases beyond a profile score threshold, the user profile can be flagged for further review/action for example, via adding the user to a gray list.

The messages can be determined as having bad content based at least on the keywords, the corresponding category into which the messages are classified and the sentiments expressed in the messages. If the messages include impolite language, rude words and the messages express sentiments that are supportive of the issues represented by the plurality of categories such messages can be determined as including bad content. In an example, the messages may be determined as including positive sentiments which oppose the issue represented by the category corresponding to the message. In this case, the message may receive a zero score. In an example, the monitoring system can be also be configured to provide a score of zero to a message expressing negative sentiments towards an issue represented by the category corresponding to the message. In either case, the messages which support bad content or the issues represented by the plurality of categories are determined as bad content and receive positive scores while messages which oppose the issues represented by the plurality of categories receive zero scores.

In an example, the plurality of categories can include a miscellaneous category. For example, if the message does not belong to any of the plurality of categories, but has a high level of negative sentiment in response, the message can be processed under the miscellaneous category as Uncategorized Negative Sentiment or miscellaneous category, which is reviewed by policy experts to determine the reason for a high negative response and then recommend policy changes to platform partners or the corresponding ones of the plurality of social networks. Messages not pertaining to any of the plurality of categories but may include certain keywords can be classified into the miscellaneous category. For example, a message which may have a substantial confidence level which is however insufficient to classify the message into a certain category of the plurality of categories can be classified under the miscellaneous category. When a message is classified into the miscellaneous category, the monitoring system determines the number of messages with similar keywords that are also classified into the miscellaneous category. If the number of messages exceeds a predetermined message threshold, then an alert can be raised within the corresponding social network(s) regarding the messages.

The social network data processing and monitoring system as disclosed herein provides for a technical solution to the problem of proliferation of bad content in the realm of online social networks before the administration of the social networks can take action. Generally, online social networks have policies or rules built into the networks to detect bad content and to mitigate spreading of the bad content within the social network(s). However, in certain instances, the bad content can be generated in heretofore unknown categories or formats. In such circumstances, the social networks do not have policies or rules to identify the bad content and are unable to prevent the proliferation of such bad content within the social networks. The monitoring system disclosed herein provides for a miscellaneous category which serves as a catchall category. However, messages in the miscellaneous category are monitored so that unexpected, objectionable content can be identified early e.g., via the negative sentiment from the associated secondary messages and may be prevented from spreading widely within the social media.

In addition, the monitoring system is configured to score not only primary posts/messages and users posting the primary content but the secondary messages that are posted in response to the primary messages are also analyzed to identify bad content and determine user behavior. Such secondary message analysis addresses another problem with online social networks which fail to detect passive-aggressive user behavior wherein users may not post primary messages which capture attention but rather comment or respond regularly to primary posts from other users. Each time a user posts bad content as secondary messages, the user's risk profile score is updated. Therefore, the monitoring system is configured to track a potential bad actor even prior to an occurrence of any egregious behavior from the user. Furthermore, while the various online social networks may have instituted policies for preventing proliferation of bad content or detecting bad actors, these policies are implemented in siloes. The monitoring system as disclosed herein provides for a centralized, consolidated platform which enables cross platform support for the plurality of social networks so that dangerous global trends and bad actors across the world can be detected and their effect mitigated. The monitoring system therefore improves online social networks by empowering the social networks to not only detect and analyze unknown message trends for bad content but also to identify potential bad actors thereby improving the safety of the virtual social networks.

FIG. 1 shows a block diagram of the social network data processing and monitoring system 100 in accordance with the examples disclosed herein. A content receiver 102 included in the monitoring system 100 continuously receives messages 172 posted to a plurality of social networks 150 $SN_1$, $SN_2$, $SN_3$ ... $SN_n$ by the users of the social network platforms and the metadata 174 of the messages 172. In an example, the monitoring system 100 can receive the messages 172 (and the message metadata) even as the messages 172 are posted to the plurality of social networks 150. The metadata 174 can include information such as but not limited to, the ids of the messages 172, the identities of users of the plurality of social networks 150 posting the messages 172, the geolocation metadata of the messages 172, the temporal data such as the time and date of posting of the messages 172, etc. The monitoring system 100 can receive the messages 172 using application programming interfaces (APIs) extended by the plurality of social networks 150 for providing data. In an example, the monitoring system 100 may include or can be communicatively coupled to a data store 190 to store the received data and data produced during the processing of the messages 172.

The messages 172 not only include the primary posts or primary messages but also secondary messages which include responses of other users to the primary posts. The primary posts can include original content generated by the user and/or content forwarded from other content platforms. Generally, a first message in a chain of messages wherein other messages in the chain respond to the first message or those which respond to other responses (i.e., sub-chains) can be considered a primary message or a primary post. The secondary messages which include responses to the primary message/post or responses in sub-chains can include textual content such as those included in comments to the primary posts or links to content from other platforms. The responses can also include non-textual content such as an image e.g., an emoji which is posted in a comment responding to the primary message. In an example, the non-textual responses can also include liking or disliking the primary message which is conveyed via the appropriate user interface (UI) widget provided by the social network platform, forwarding or sharing the primary message without comment, etc. The messages 172 received by the content receiver 102 from the plurality of social networks 150 can therefore include both textual content and non-textual content such as image or video data. In an example, the image or video data can also be encrypted e.g., hashed when received at the monitoring system 100 in order to protect user privacy and comply with any international laws.

It can be appreciated that in order to protect user privacy, the plurality of social networks 150 can provide the monitoring system 100 with encrypted forms of the user identifiers. Such encrypted user ids enable the monitoring system 100 to track users individually but without the knowledge of the real identities of the users. In an example, one or more of the plurality of social networks can be associated with multiple social network platforms. For example, Facebook® runs multiple social network platforms such as Whatsapp® and Instagram® in addition to Facebook®. When a user employs a common user identifier across the multiple social network platforms run by a single social network, the monitoring system 100 can be configured to analyze the user behavior across the multiple social network platforms.

The messages 172 and the metadata 174 are accessed by a content analyzer 104 which is configured to process and analyze the textual and non-textual content of the messages 172. Analysis of textual content can include application of textual processing techniques to obtain keywords 176. Similarly, textual metadata of the non-textual content that includes the image text, URLs, comments, captions, etc., which can also be analyzed to obtain the keywords 176. The keywords 176 are used to categorize the messages 172 into one or more of the plurality of categories 182. The plurality of categories 182 can also include a miscellaneous category 184 wherein content that cannot be classified into any other category of the plurality of categories 182 is classified into the miscellaneous category 184. The miscellaneous category 184 enables a social network to handle content or messages on issues that were not previously detected. In an example, the plurality of categories 182 can pertain to bad content or forbidden content or content which the social network would curb or moderate. For example, the plurality of categories 182 can be framed to identify content related to hate crimes, child abuse, self-harm, etc. In addition, if there is content which does not belong to any of the aforementioned categories but which is still not desirable for proliferation within the social network, such content can be classified under miscellaneous category 184. The messages for various categories can be classified based on confidence thresholds as detailed further herein.

In addition, the content analyzer 104 can also be configured to identify sentiments expressed in the messages 172 from the plurality of social networks 150. Each of the primary messages from the messages 172 can be associated with one of a positive, negative or neutral sentiment with respect to a category of the primary message. Similarly, the secondary messages or responses posted to the primary messages can also have sentiments associated therewith that are extracted based on the textual or non-textual content of the responses. For example, a like or a heart or a smiley emoji indicates a positive sentiment, while an angry face, a thumbs down can indicate a negative sentiment whereas another action such as forwarding without comment can be rated as being neutral. Each of the messages 172 can be scored based on a combination of the actual content of a message, the sentiment expressed in the message and an action associated with the message (if it is a secondary message). The scores can be indicative of identifying bad content and/or bad actors posting the bad content. Accordingly, the posts having higher scores can be identified as ban content. Based on the message score, the monitoring system 100 can recommend quarantining the message and/or the user posting the message. In an example, the content analyzer 104 can monitor the rate at which the messages 172 are received for a specific category of the plurality of categories 182.

For each of the messages thus scored, the user ids are accessed by the user profiler 106 which assigns risk profile scores 162 to each of the users. When a user is detected as posting bad content in a primary post/message, the risk profile score of the user is incremented by a first predetermined level. When the user is determined as including bad content or bad action in a secondary message, the user's risk profile score can be incremented by a second predetermined level that is less than the first predetermined level. The risk profile scores 162 of the users are thus incremented over a period of time. In an example, the risk profile scores 162 of the users can be pushed out to the corresponding social network of the plurality of social networks 150 routinely on a periodic basis or each time the risk profile score of the user is updated. In an example, the user profiler 106 can monitor the rate at which the risk profile score, of a particular user is increasing. If the rate of increase of the risk profile score of the user is greater than an average rate of increase of the risk profile score within the corresponding social network, then the corresponding social network can be alerted as it can indicate unusual activity from a potential bad actor.

An alert generator 108 generates various notifications or alerts related to the trends in the messages and/or the users. Based on whether the trends pertain to one social network or multiple social networks, the alerts can be transmitted to one or more of the plurality of social networks 150. In an example, the alerts may be transmitted only to the social network from which the analyzed messages are collected. In an example, the alerts may be transmitted to the plurality of social networks 150 where applicable. As mentioned above, if a user is using a single id across multiple platforms of a social network, then the alerts can be transmitted to all the multiple platforms of the social network. In an example, the alert generator 108 can be coupled to GUIs 112 which include various dashboards. The dashboards can provide data about the messages 172 at various granularity levels ranging from individual users to global trends in the messages. In an example, the geolocation information from the metadata 174 of the messages 172 can be employed to display the global trends in messaging for the various social network platforms. If particular data or information is transmitted across to multiple ones of the plurality of social networks 150, the data may be anonymized to protect user privacy.

The content analyzer 104 includes AI models as detailed herein for executing the tasks of content categorization and sentiment extraction. A model trainer 114 provides training data 130 for training the AI models. The training data 130 can include categorization training data 132 which includes labelled data for training the AI model for content categorization wherein training messages are labelled with one of the plurality of categories 182. Similarly, the training data 130 can also include sentiment training data 134 wherein messages labelled with the sentiments can be used for sentiment extraction. The messages that receive a score or the messages that may be flagged for further processing can be identified based on rules which specify specific combinations of the category of the messages, the sentiments expressed in the messages and the actions associated with the messages. Of course, there can be a number of messages that fall into the miscellaneous category 184 which are again discarded without further processing when there is insufficient volume of messages. The monitoring system 100 thus provides for a centralized platform that monitors user behavior and detects trends across the plurality of social networks 150 which usually operate in siloes. In an example all messages classified under the miscellaneous category 184 that have negative secondary messages will be evaluated manually by policy reviewers to verify if there is a new trend ongoing that will impact other platforms later and alerts may be broadcasted to one or more of the plurality of social networks 150 as needed.

Although the various elements of the monitoring system 100 are shown as being hosted on a single server, it can be appreciated that this is not necessary. In some examples certain elements such as the content analyzer 104 and the user profiler 106 that are trained can be hosted on one or more of the plurality of social networks 150. Anonymized user data along with the categorized messages and the corresponding sentiments can be transmitted back to the alert generator 108 for review by policy experts. The alerts that are generated in response can be transmitted to one or more of the plurality of social networks 150 as needed in order to enable the plurality of social networks 150 to share intelligence regarding bad content and/or bad actors.

Figure 2:
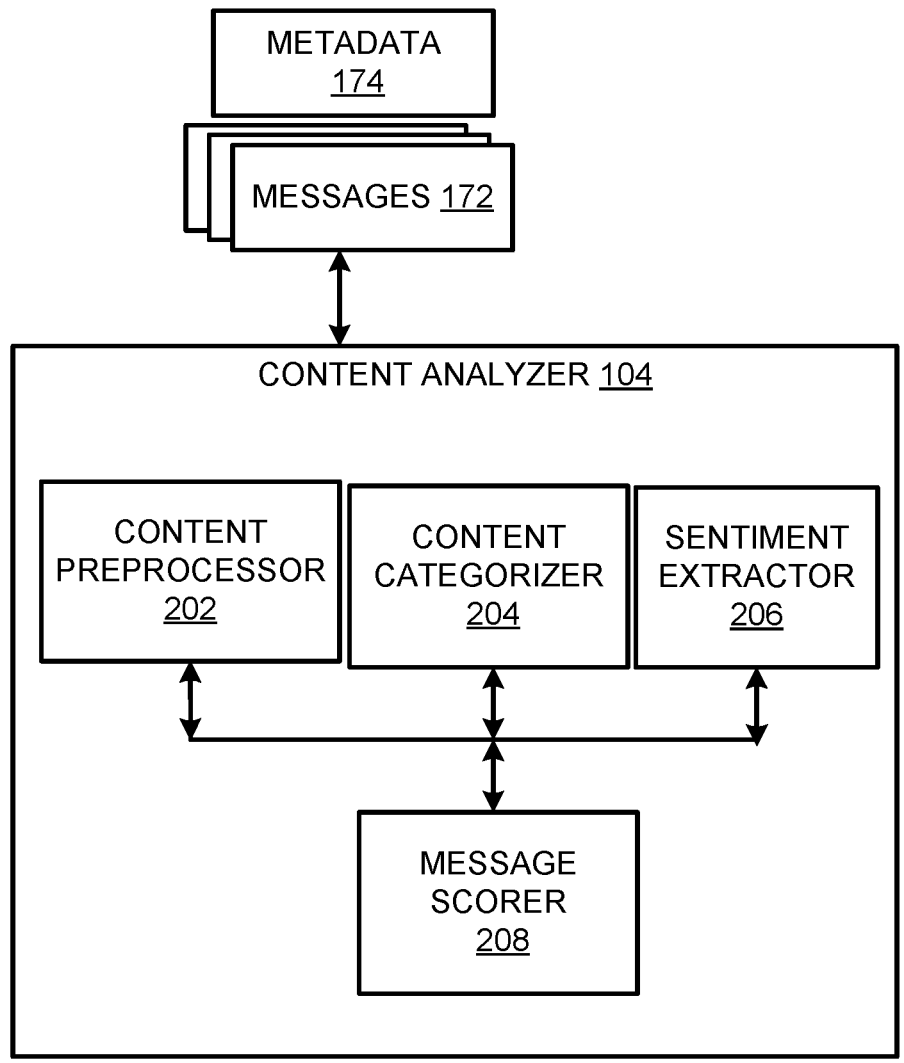
FIG. 2 shows a block diagram of a content analyzer in accordance with the examples disclosed herein.

FIG. 2 shows a block diagram of the content analyzer 104 in accordance with the examples disclosed herein. The content analyzer 104 includes a content preprocessor 202, a content categorizer 204, a sentiment extractor 206 and a message scorer 208. The content preprocessor 202 employs content processing techniques such as parsing, tokenizing, removal of stop words and punctuation, etc., for initially processing the messages 172. In addition, the tokens generated can be tagged with the POS data to produce the keywords 176.

The keywords 176 are employed by the content categorizer 204 to categorize the messages 172 into one or more of the plurality of categories 182. In an example, the plurality of categories 182 can be based on content for which specific rules may be implemented by the plurality of social networks 150. More particularly, the plurality of categories 182 may pertain to bad content and the plurality of social networks 150 may want to prevent the proliferation of such bad content. By way of illustration and not limitation, the plurality of categories 182 can include categories for violence, hate crimes, child abuse, self-harm, terrorism, bullying, hate speech etc. In addition, the plurality of categories 182 include the miscellaneous category 184 which can act as a catchall category for which the plurality of social networks 150 may not yet have policies or rules but which the plurality of social networks 150 may desire to review and/or moderate.

The content categorizer 204 can be based on AI algorithms such as but not limited to, multi-class logistic regression. The content categorizer 204 can be trained via supervised learning on labelled categorization training data 132. The content categorizer 204 is therefore trained to select the content categories based on confidence levels. If the confidence level is insufficient for any of the plurality of categories 182 other than the miscellaneous category 184, the message can be categorized under the miscellaneous category 184. If there are sufficient number of messages within the miscellaneous category 184 with similar keywords, an alert may be raised for the transmission to one or more of the plurality of social networks 150. The monitoring system 100 is therefore configured to detect and respond to unknown or new trends in messaging for which no policies have been framed by the plurality of social networks 150. For example, the plurality of social networks 150 may not have policies or rules to moderate content pertaining to a fringe element such as "killing black cats". Without a rule or policy in place, the content related to such violent theme can proliferate within a social network platform quickly before the social network platform can detect and stop the flow of the pertinent messages. The miscellaneous category 184 can be used to capture and quarantine the bad content thereby preventing the proliferation of bad content in addition to discouraging the growth of negative trends in the society by denying them publicity.

The messages which are categorized are processed by the sentiment extractor 206 for the extraction of the sentiment expressed therein. The sentiment extractor 206 can also be based on AI algorithms such as, but not limited to, multi-class neural network. The multi-class neural network is also trained via supervised learning on explicitly labelled sentiment training data 134 for extracting sentiments from the messages 172. In an example, the sentiment training data 134 can have messages labelled explicitly with positive, negative and neutral sentiments so that when trained, the sentiment extractor 206 is configured to extract such sentiments from the messages 172 received from the plurality of social networks 150.

The content analyzer 104 further includes a message scorer 208 to score messages based on rules. The rules can specify combinations of different factors and weights to be assigned to the factors for scoring. The factors can include but are not limited to, the position of the message within a message chain, the category into which the message is classified, the sentiment expressed in the message and an action associated with the message. In an example, the messages can be given a non-zero score or a positive score if the messages are to be further processed and a zero score if the messages can be discarded without further processing. The message scorer 208 can be configured programmatically to assign predetermined scores for the position of a message within a message chain so that if the message is a primary post then a high score is assigned to the message and if the message is a secondary post or a response to a primary post, lesser score is assigned. Also, various actions as indicated in the secondary posts can be given different scores. The scores thus assigned to the various messages can be transmitted to the user profiler 106 for processing the user information and generating the risk profile scores 162 for the users.

Figure 3:
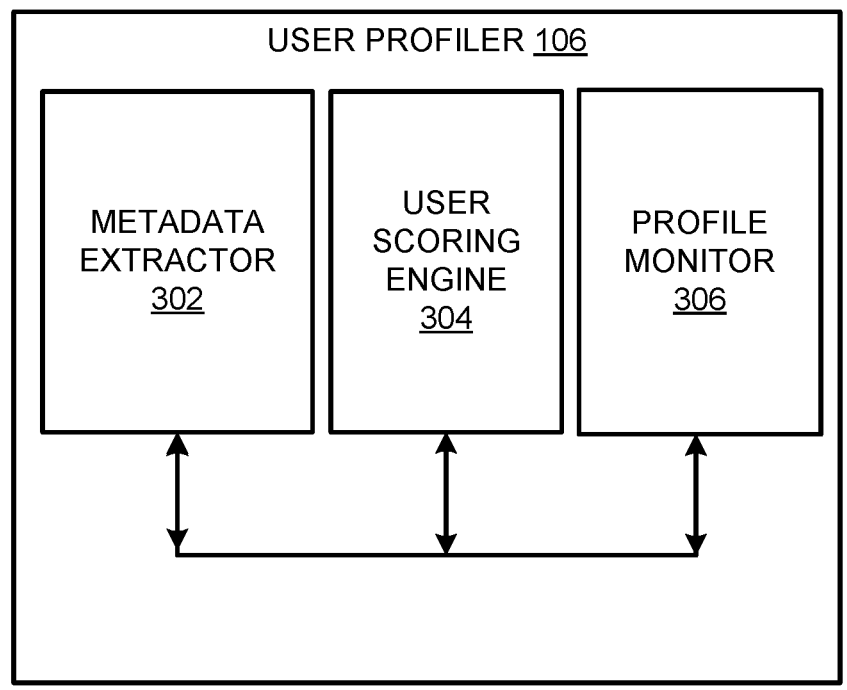
FIG. 3 shows a block diagram of a user profiler in accordance with the examples disclosed herein.

FIG. 3 shows a block diagram of the user profiler 106 in accordance with the examples disclosed herein. The user profiler 106 includes a metadata extractor 302, a user scoring engine 304 and a profile monitor 306. The metadata extractor 302 obtains metadata including the user info associated with the scored messages. The score from the messages can be added to the risk profile score of the user by the user scoring engine 304. Therefore, as the messages from a particular user gain positive ratings, the ratings are added to the risk profile score of the user. In an example, the risk profile scores of the users of a social network platform can be periodically updated to the corresponding social network platform. In an example, a profile monitor 306 can also be configured to detect the rate at which the risk profile score of a user changes. As the risk profile score of the user changes more rapidly, the corresponding social network can be alerted regarding the user being a potential bad actor.

Figure 4:
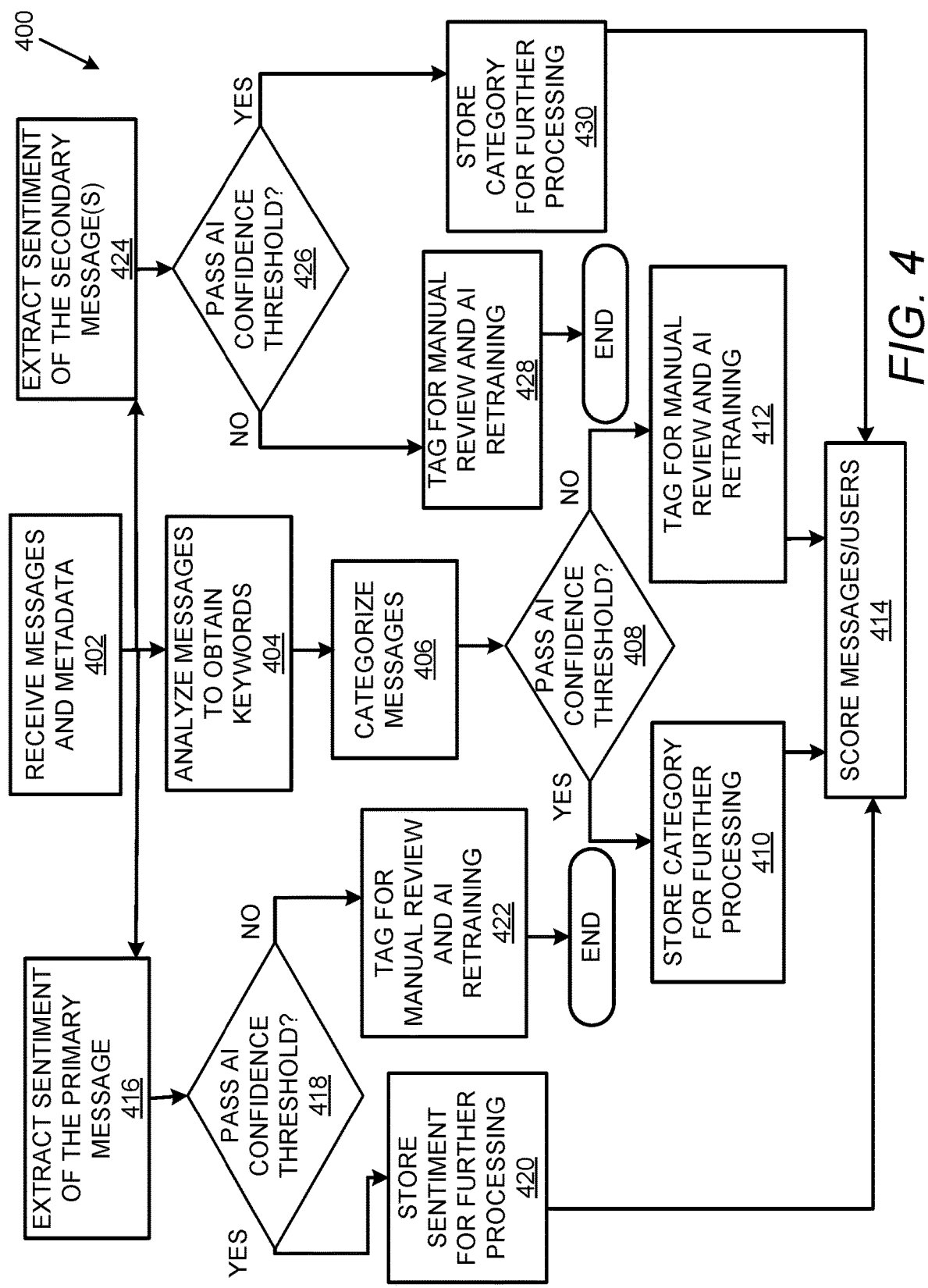
FIG. 4 is a flowchart that details a method of monitoring social network content in accordance with the examples disclosed herein.

FIG. 4 is a flowchart 400 that details a method of monitoring social network data in accordance with the examples disclosed herein. The method begins at 402 wherein the messages 172 along with the metadata 172 are received from the plurality of social networks 150. At 404, the messages 172 are each analyzed using content analysis techniques for extracting the keywords 176. As mentioned above, the messages 172 can include content in textual format as well as non-textual formats such as images, video, etc. When images or video are being analyzed, the content preprocessor 202 is configured to obtain textual metadata of the non-textual content such as the image text, comments or tags associated with the image, etc. The textual content of the image(s) can be analyzed at 404 for the extraction of the keywords 176. The keywords 176 that are obtained can be used to categorize the messages 172 into the plurality of categories 182 at 406. The plurality of categories 182 can represent various content topics or subjects for which the dissemination of the content is discouraged on the plurality of social networks 150. The topics can include abuse, hate crimes, hate speech, etc. In addition, the plurality of categories 182 also include the miscellaneous category 184 which acts as a catchall category for content which requires further review but which cannot be classified into any of the other categories with sufficient confidence.

At 408, it is determined if the messages have been classified into at least one category in a manner that clears the AI threshold. If yes, the category is stored at 410 for further processing. Otherwise the messages that do not meet the AI confidence threshold are tagged for manual review at 412. The method proceeds to 414 wherein the messages and the users posting the messages are scored.

Further upon receiving the messages, the primary messages are analyzed at 416 for sentiment extraction. It is further determined at 418 if the confidence associated with the sentiment extraction meets the AI confidence threshold. If yes, the method proceeds to 420 wherein the sentiment is stored for further processing which can include scoring the messages at block 414. If it is determined at 418, that the confidence associated with the extracted sentiment does not meet the AI confidence threshold, the method proceeds to 422 to tag the message for manual review wherein a human user examines the message(s) that do not meet the confidence threshold and manually provides the sentiment information. The received manual response can be used for retraining the sentiment extractor 208 and the method terminates on the end block.

Upon receiving the messages at 402, the secondary messages that are received in response to the primary messages are also analyzed at 424 for sentiment extraction. It is further determined at 426 if the confidence associated with the sentiment extraction meets the AI confidence threshold. If yes, the method proceeds to 430 wherein the sentiment is stored for further processing which can include scoring the messages at block 414. If it is determined at 426, that the confidence associated with the extracted sentiment does not meet the AI confidence threshold, the method proceeds to 428 to tag the message(s) for manual review wherein a human user examines the message(s) that do not meet the confidence threshold and manually provides the sentiment information. The received manual response can be used for retraining the sentiment extractor 208 and the method terminates on the end block.

Figure 5A:
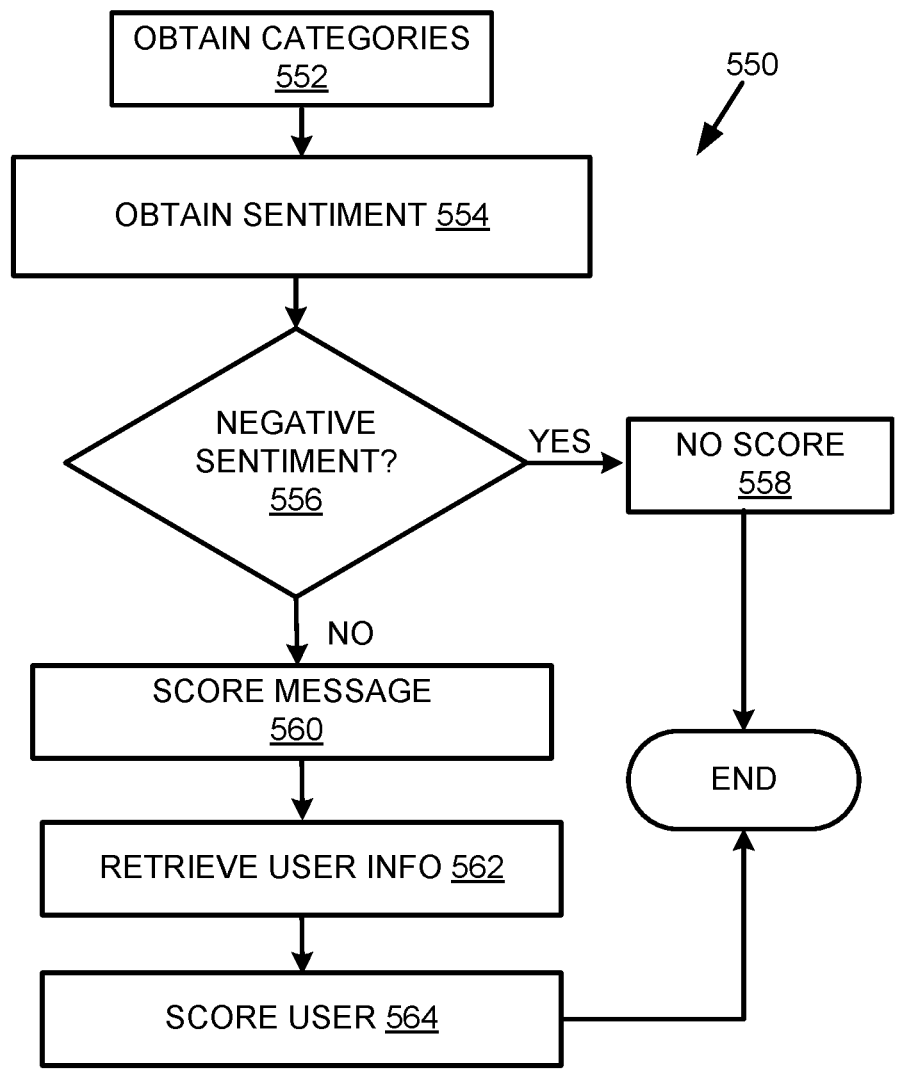
FIG. 5A shows a flowchart that details a process of scoring a primary message in accordance with the examples disclosed herein.

FIG. 5A shows a flowchart that details a process of scoring a primary message or a primary post based on the rules in accordance with the examples disclosed herein. The messages 172 received at the monitoring system 100 are scored differently based on the status or position of the message in a message chain that may include one or more messages. If there are no responses to the message, then the single message is treated as the primary message by the monitoring system 100. At 552, the category corresponding to the primary message is accessed. As mentioned above, the plurality of categories 182 pertain to negative topics for which the content is moderated or discouraged by the plurality of social networks 155. At 554, the sentiment extracted from the primary message is obtained. Accordingly, it is determined at 556 if the sentiment extracted from the primary message is a negative sentiment. If yes, the method proceeds to 558 wherein no score is assigned to the message or the user posting the message since the categories pertain to negative topics and the process terminates on the end block. If it is determined at 556 that a positive sentiment was extracted from the message, the process moves to block 560 wherein a score is assigned to the message. In addition, the user information such as the user id posting the message is retrieved at 562 and a score is assigned to the user posting the message at 564. In an example, the scores assigned to the messages posted by the user can be aggregated as the risk profile score of the user.

Figure 5B:
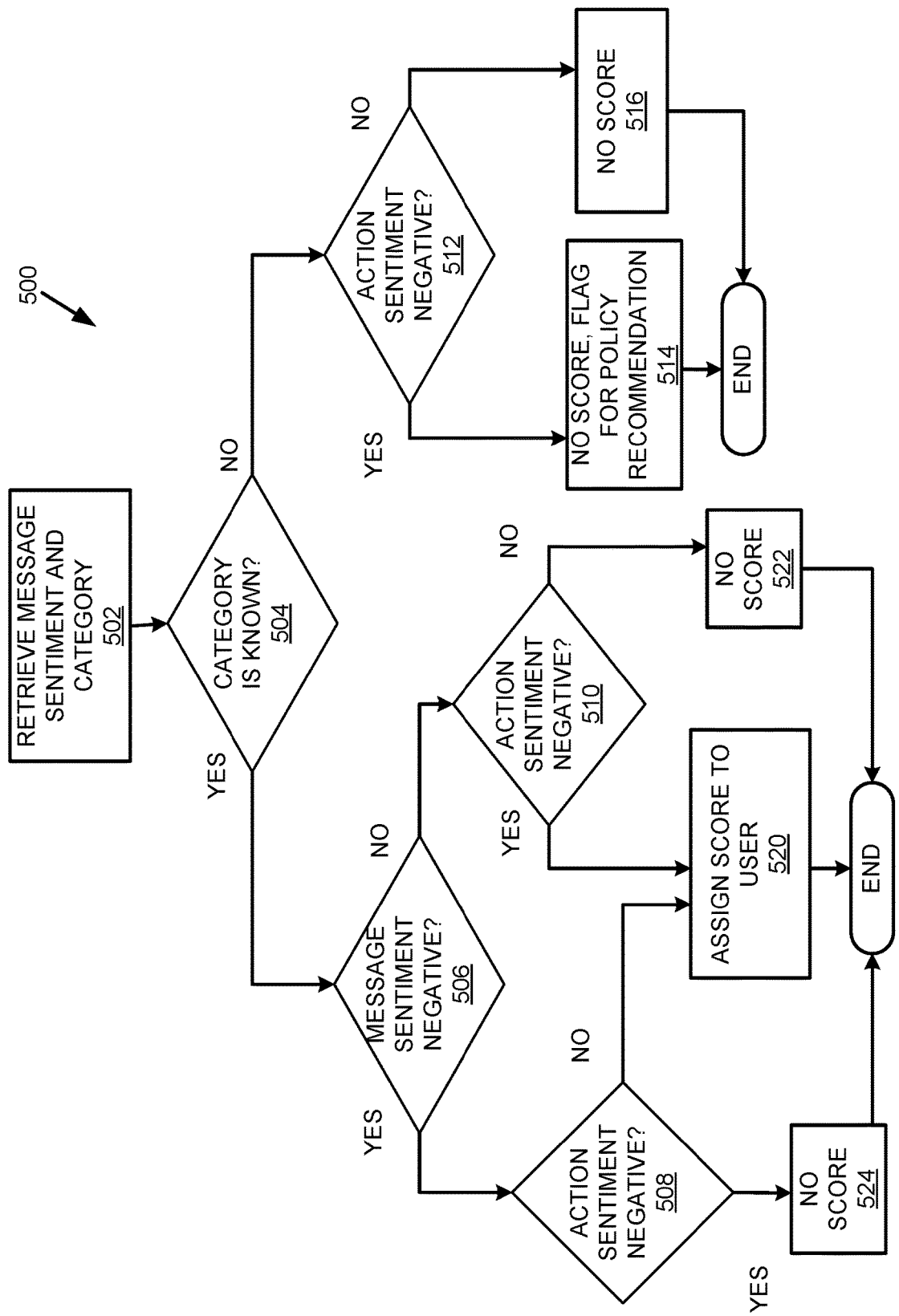
FIG. 5B shows a flowchart that details a process of scoring a post in accordance with the examples disclosed herein.

FIG. 5B shows a flowchart 600 that details a process of scoring a post in accordance with the examples disclosed herein. The method begins at 502 wherein the message sentiment and category is retrieved. At 504, it is determined if the category of the primary message or post is known. If it is determined that the category is known at 502, it is further determined at 506 if the message sentiment is negative. If it is determined at 506 that the message sentiment is negative, it is further determined at 508 if the action sentiment or the sentiment associated with a secondary message is negative. If yes, no score is provided for the secondary message at 524 and the process terminates on the end block. If it is determined at 508, that the action sentiment or the sentiment of the secondary message is not negative, a score is assigned to the user as shown at 520 and the process terminates on the end block. If it is determined at 506 that the primary message sentiment is not negative, it is further determined at 510 if the secondary message sentiment or action sentiment is negative. If yes, a score is assigned to the user and the process terminates on the end block. If it is determined at 510 that the secondary message sentiment or action sentiment is not negative no score is provided for the secondary message at 522 and the process terminates on the end block.

At 504, if it is determined that the category is not known then the primary post or message can be classified into the miscellaneous category 184. At 512, it is further determined if the secondary message sentiment or action sentiment is negative. If yes, no score is assigned for the user/message but the message is flagged for review and policy recommendation by a user, e.g., a policy expert. If at 512, it is determined that the secondary message sentiment or action sentiment is not negative, no score is provided for the secondary message at 516 and the process terminates on the end block.

Figure 6:
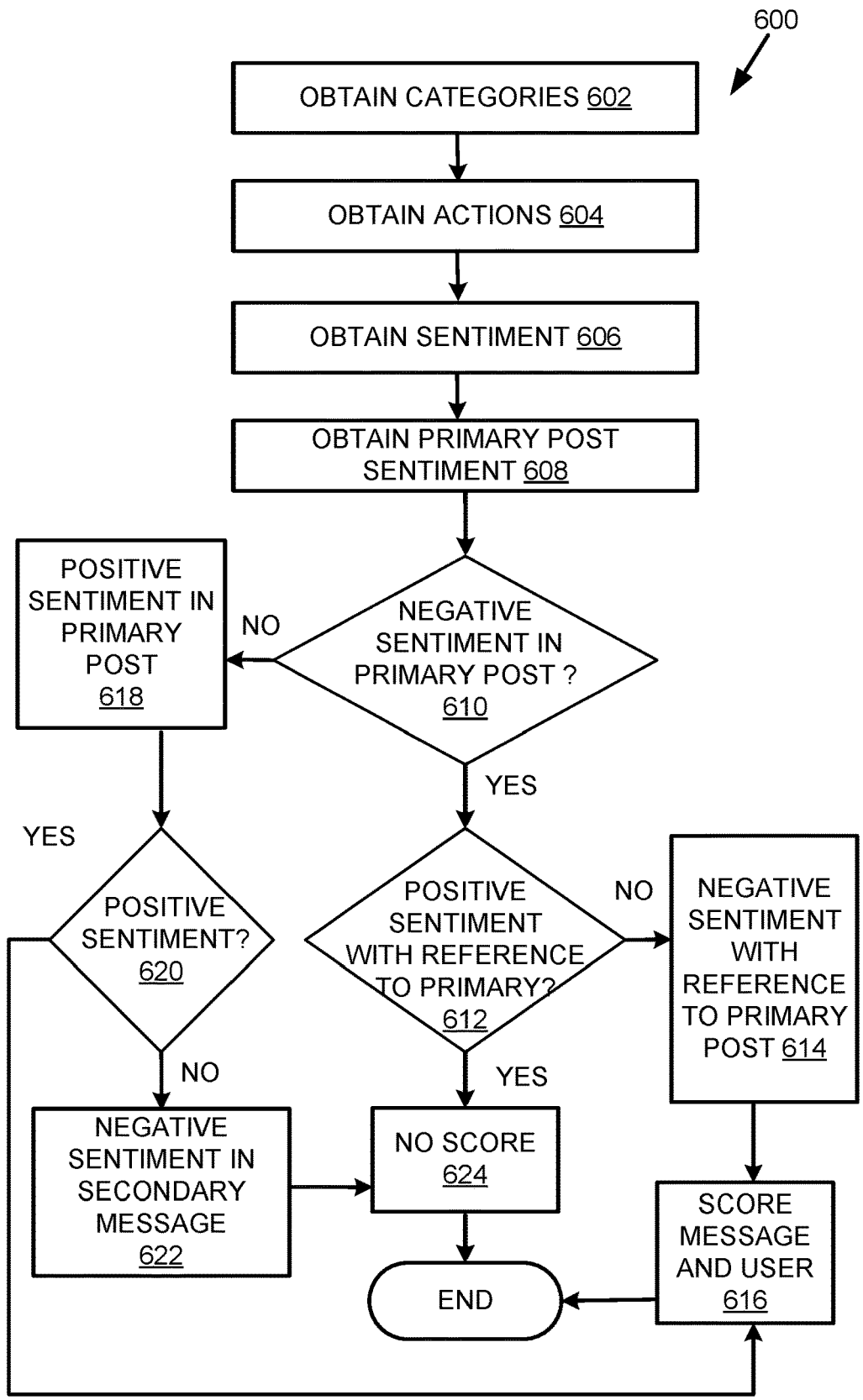
FIG. 6 shows a flowchart that details a process of scoring a secondary message or a response to a primary post in accordance with the examples disclosed herein.

FIG. 6 shows a flowchart 600 that details a process of scoring a secondary message or a response to a primary post in accordance with the examples disclosed herein. The monitoring system 100 is configured to identify not only bad actors who post negative content on the social media platforms but also the potential bad actors who are characterized by passive/aggressive behavior. Such behaviors can include responding positively to or otherwise encouraging/supporting messages with positive sentiments towards the negative topics as characterized by the plurality of categories 182. Similarly, passive/aggressive user behavior can include responding negatively to or otherwise discouraging messages with negative sentiments towards the negative topics. Thus, secondary messages or responses to primary posts are evaluated for their content and actions associated therewith and are scored accordingly. However, the scores assigned to such secondary messages are lower than the scores assigned to the primary messages.

The process for scoring secondary messages begins at 602 wherein a category of the secondary message is obtained. In an example, the category of the secondary message can be the same category as the primary message that the secondary message responds to. At 604, the action associated with the secondary message is obtained. The action associated with the secondary message can include without limitation, a response with textual or non-textual comment/content, a like/dislike reaction input via a UI element provided by the social network platform, forwarding the primary post with or without comment to another user on the social network platform or to another communication channel such as another social network platform or an email, as a text message, etc. In an example, information regarding the secondary message such as the message chain that includes the secondary message, other messages in the message chain including the secondary message, the action associated with the secondary message, etc., can be obtained from the metadata 174. The sentiment expressed in the secondary message is obtained at 606 while the sentiment expressed in the primary post to which the secondary message forms a response is obtained at 608.

At 610, it is determined if a negative sentiment or a neutral sentiment is extracted from the primary post. If it is determined at 610 that a negative sentiment or a neutral sentiment was extracted from the primary post, it is further determined at 612 whether a positive sentiment is expressed in the secondary message with respect to the primary post. If it is determined at 612 that a positive sentiment or a neutral sentiment is expressed in the secondary message with respect to the primary post the process terminates at 624 without assigning score to the message or the user. As detailed above, the plurality of categories 182 include topics with negative tones and a primary message expressing negative sentiments towards negative topics such as violence, bullying, abuse or terrorism are not from bad actors. Similarly, the secondary message which expresses a positive sentiment or a neutral sentiment with respect to the primary post supports the stand of the primary post and hence does not merit a score. If it is determined at 612 that a positive sentiment or a neutral sentiment is not expressed in the secondary message with respect to the primary post, the process moves to 614 wherein it is determined that the secondary message expresses a negative sentiment in response to the primary post. Hence, a score based on the content and action of the secondary message is assigned to the message at 616 and similarly to the user and the process terminates on the end block.

If it is determined at 618 that a positive sentiment was extracted from the primary post, it is further determined at 620 whether a positive sentiment is expressed in the secondary message with respect to the primary post. If at 620, it is determined that a positive sentiment is expressed in the secondary message with respect to the primary post, the method moves to 616 wherein a positive score is added to the secondary message and the risk profile score of the user posting the secondary message is updated accordingly. This is because the primary post expresses a positive sentiment towards a negative topic and the secondary message/post expresses a positive sentiment towards the primary post thereby supporting or encouraging the negative topic and hence the updates to scores of the secondary message and the user posting the secondary message. If at 620, it is determined that a positive sentiment was not expressed in the secondary message with respect to the primary post, it is determined at 622 that the secondary message included a negative sentiment or a neutral with respect to the primary post. Therefore, the process terminates at 624 without assigning score to the message or the user as the secondary message discourages or does not support the negative topic.

Figure 7:
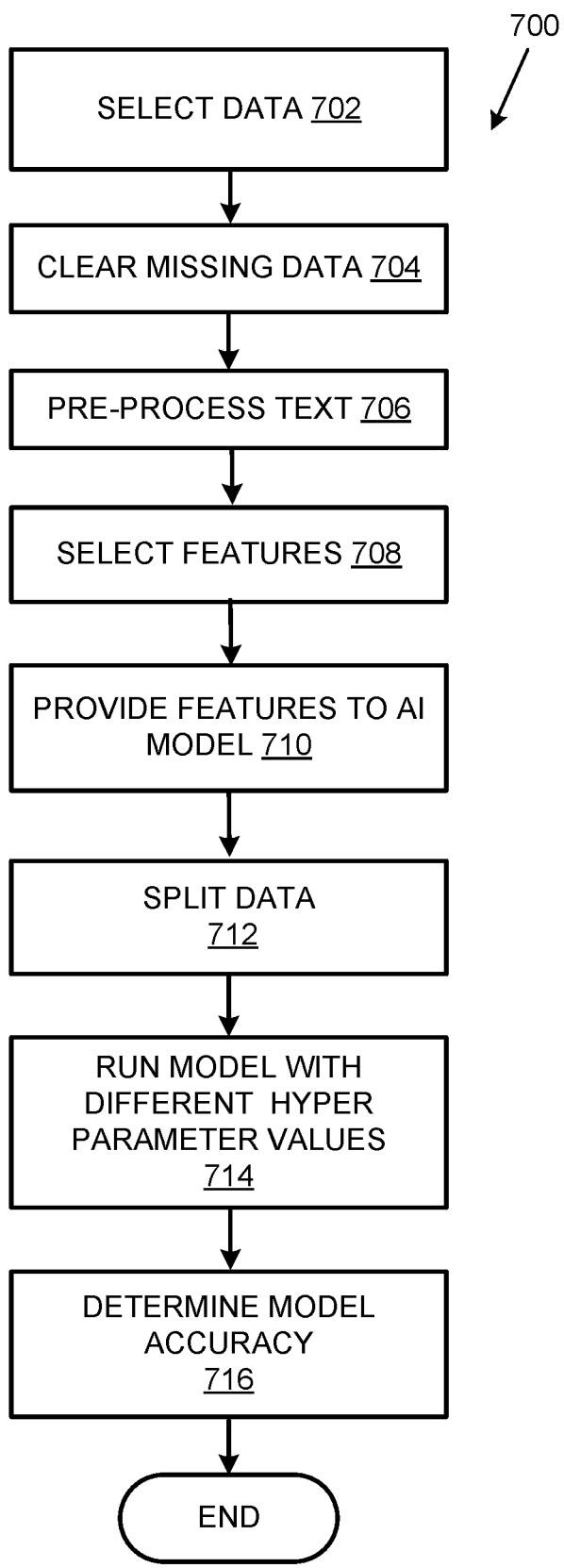
FIG. 7 shows a flowchart that details a method of training an AI model for categorizing content in accordance with the examples disclosed herein.

FIG. 7 shows a flowchart 700 that details a method of training an AI model for categorizing content in accordance with the examples disclosed herein. The method begins at 702 wherein the data for training the AI algorithm is selected. More particularly, the columns in a dataset are selected at 702. The dataset can include messages labelled with specific content categories that are to be recognized by the trained AI model. The missing data is removed from the dataset at 704. The text in the dataset is preprocessed at 706. Preprocessing of data can include normalizing upper case letters to lower case, removing numbers and special characters, email addresses, etc. The features to train the model are extracted at 708. The features are provided to the AI model at 710. For content categorization, the AI model includes a multiclass logistic regression model. At 712, the cleaned and processed data is split into training data and test data. The multiclass logistic regression model is run with different values of hyper parameters at 714 with the training in order to identify the best model or the optimal hyper parameter values. At 716, the accuracy of the final model is determined with the test data.

Similarly, a training process can be implemented for the sentiment extractor 206 which is based on multiclass neural network.

Figure 8:
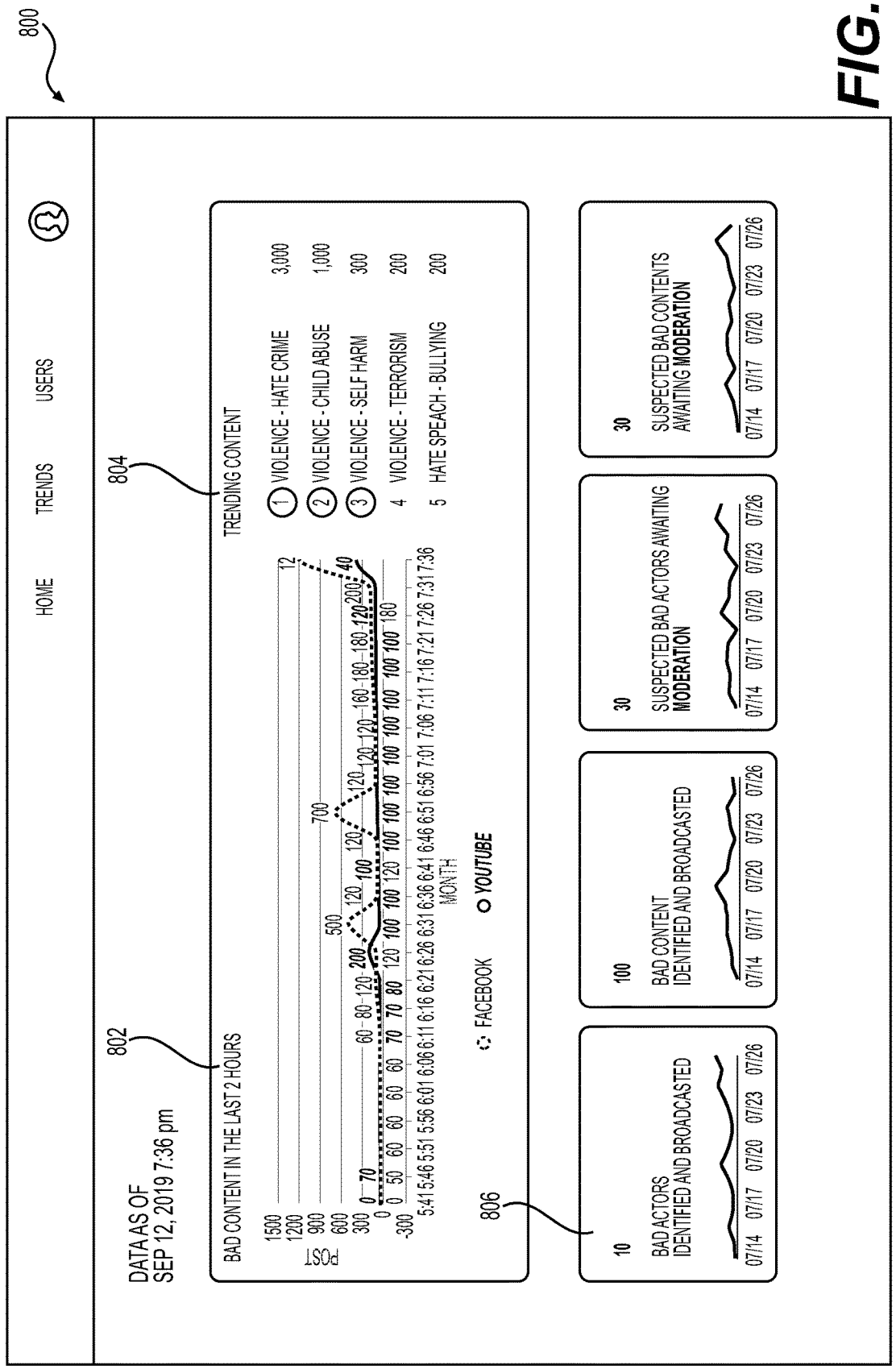
FIG. 8 shows a dashboard used by the monitoring system to convey data to administrative users regarding the messages accessed from one or more of the plurality of social networks in accordance with the examples disclosed herein.

FIG. 8 shows a dashboard 800 which is one of the GUIs 112 used by the monitoring system 100 to convey data to administrative users regarding the messages 172 accessed from one or more of the plurality of social networks. The dashboard 800 can be used to view the information from a single social network or it can produce a consolidated view from the plurality of social networks 150. At 802 a view of bad content in the preceding two hours is shown for two social network platforms—Facebook and Youtube. The trending content 804 pertaining to the plurality of categories is also shown along with the number of messages or content items posted on the platforms. In an example, the trending content 804 can show a consolidated view from both the social network platforms. Similarly, the number of bad actors (i.e., users posting objectionable content) and the number of bad content items posted to the social networks are also displayed at 806.

Figure 9:
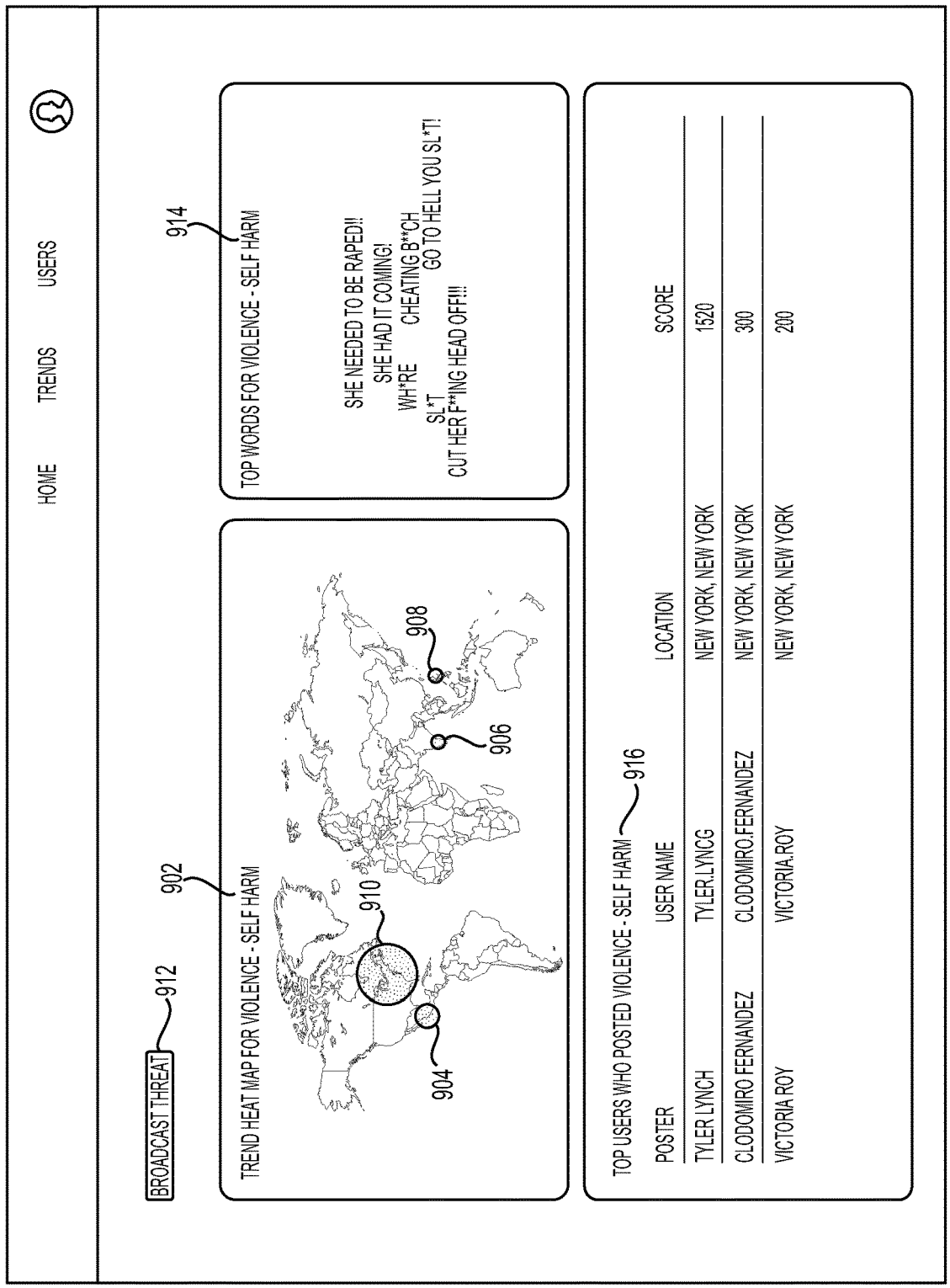
FIG. 9 shows a map based graphical user interface (GUI) that displays the geographic locations associated with messages pertaining to a specific category in accordance with the examples disclosed herein.

FIG. 9 shows a map GUI 900 that displays the geographic locations associated with messages pertaining to a specific category in accordance with the examples disclosed herein. More particularly, a trend heat map 902 for the category "violence" is displayed which shows different locations 904, 906, 908 and 910 where most of the pertinent messages are being posted. It can be appreciated that the trend heat map 902 can display the information in almost real-time as the messages are being received by the plurality of social networks 150 since the received messages are transmitted to the monitoring system 100 even as they are received at the plurality of social networks 150. Accordingly, if the trends get stronger, the broadcast threat button 912 can be pressed and an alert can be transmitted to the plurality of social networks 150 regarding the violence-related messages. The top keywords 914 for violence/self-harm category and the top users 916 who are posting the messages along with their locations and user scores are also displayed. In an example, the map GUI 900 can be configured to provide a trend heat map showing the geographical locations associated with the one or more messages categorized into the miscellaneous category 184. Thus, if unknown trends are detected in the messages of a social network, an administrative user on the monitoring system 100 can determine at a glance whether the unknown trend is a local trend or a global trend across the plurality of social networks 150.

Figure 10:
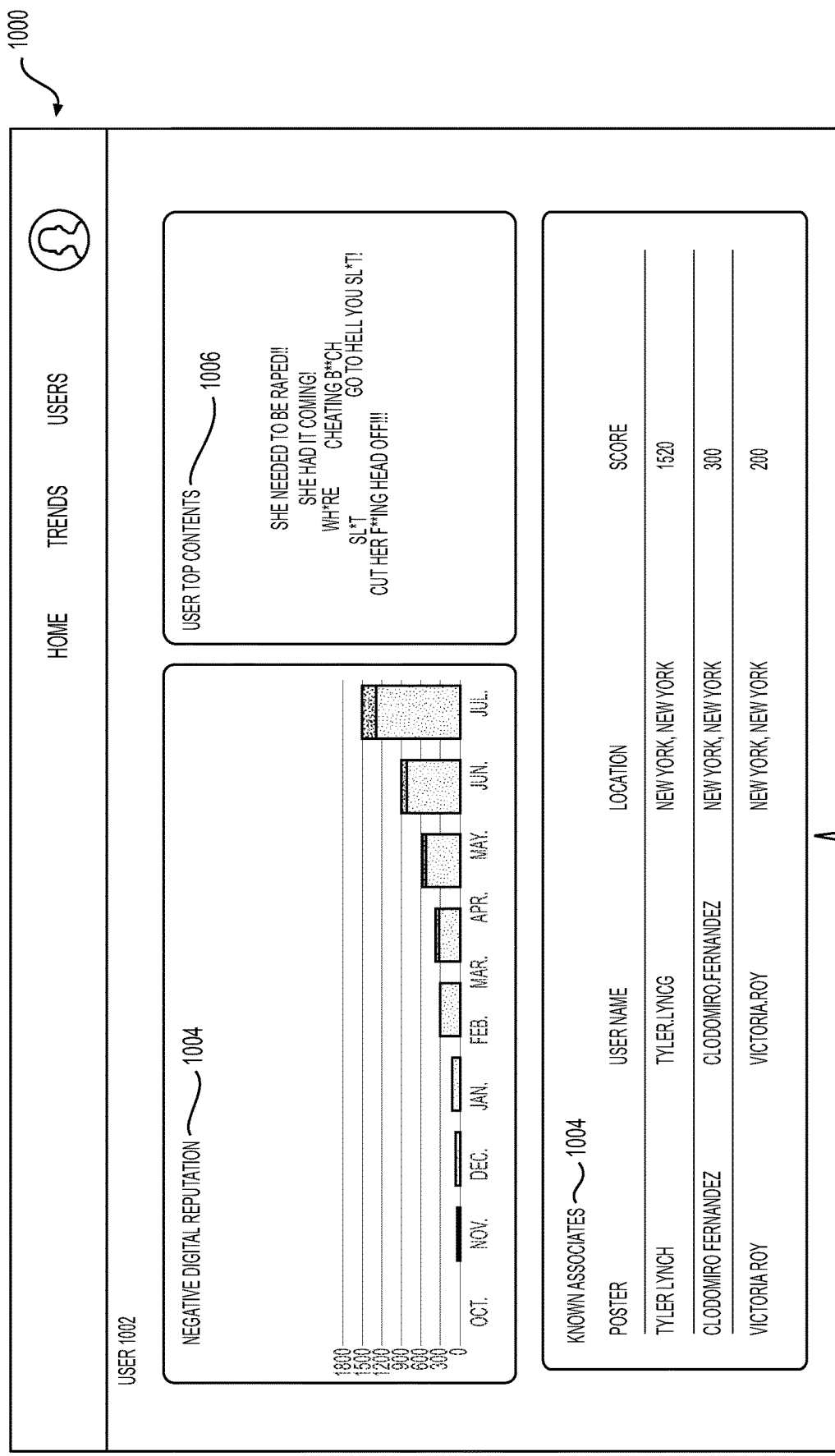
FIG. 10 shows another GUI showing data from messages of a particular user that is gathered in accordance with the examples disclosed herein.
Figure 10:
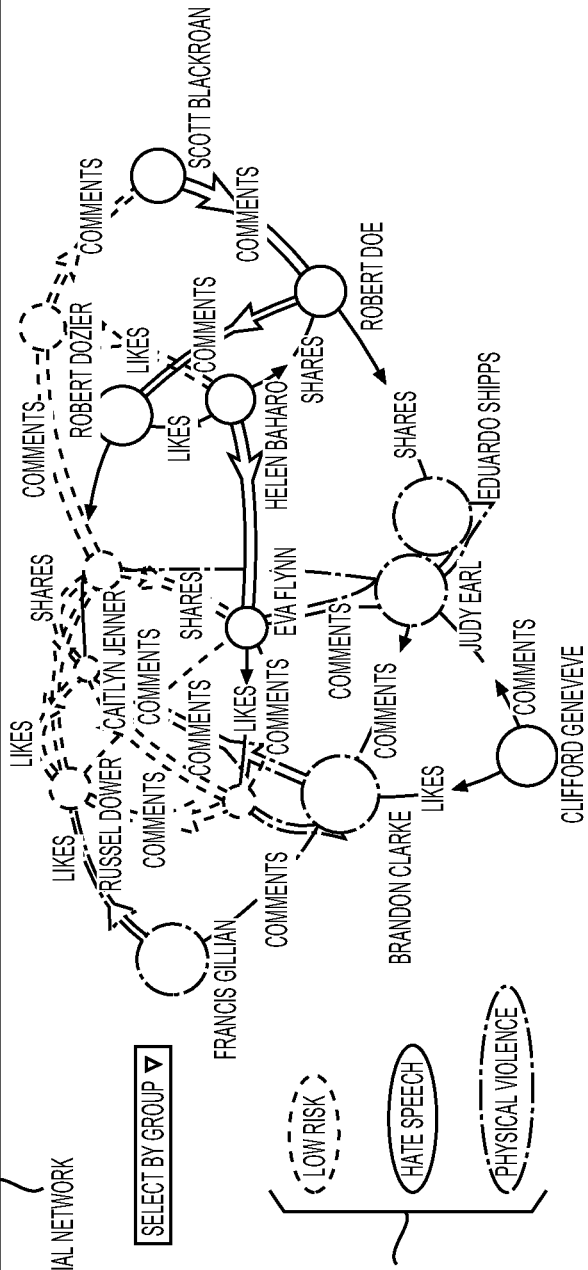

FIG. 10 shows a user monitoring GUI 1000 showing data from messages of a particular user 1002 that is gathered in accordance with the examples disclosed herein. At 1004, the negative digital reputation of the user 1002 over a time period on a social network platform is displayed. The top contents 1006 in the user's 1002 messages and the known associates 1008 of the user 1002 are also displayed. In addition, the attributes of the associates including the associates' locations and the scores aggregated into the associates' user accounts are also displayed under the known associates 1008 tab. The social network diagram 1010, the network associates of the user 1002 are displayed along with the topics 1012 and the actions such as sharing, liking, commenting, etc., that the user and the network associates execute on the social network. The social network diagram 1010 enables discovery of not only the user 1002 but also other associates of the user 1002 who may be potential bad actors.

Figure 11:
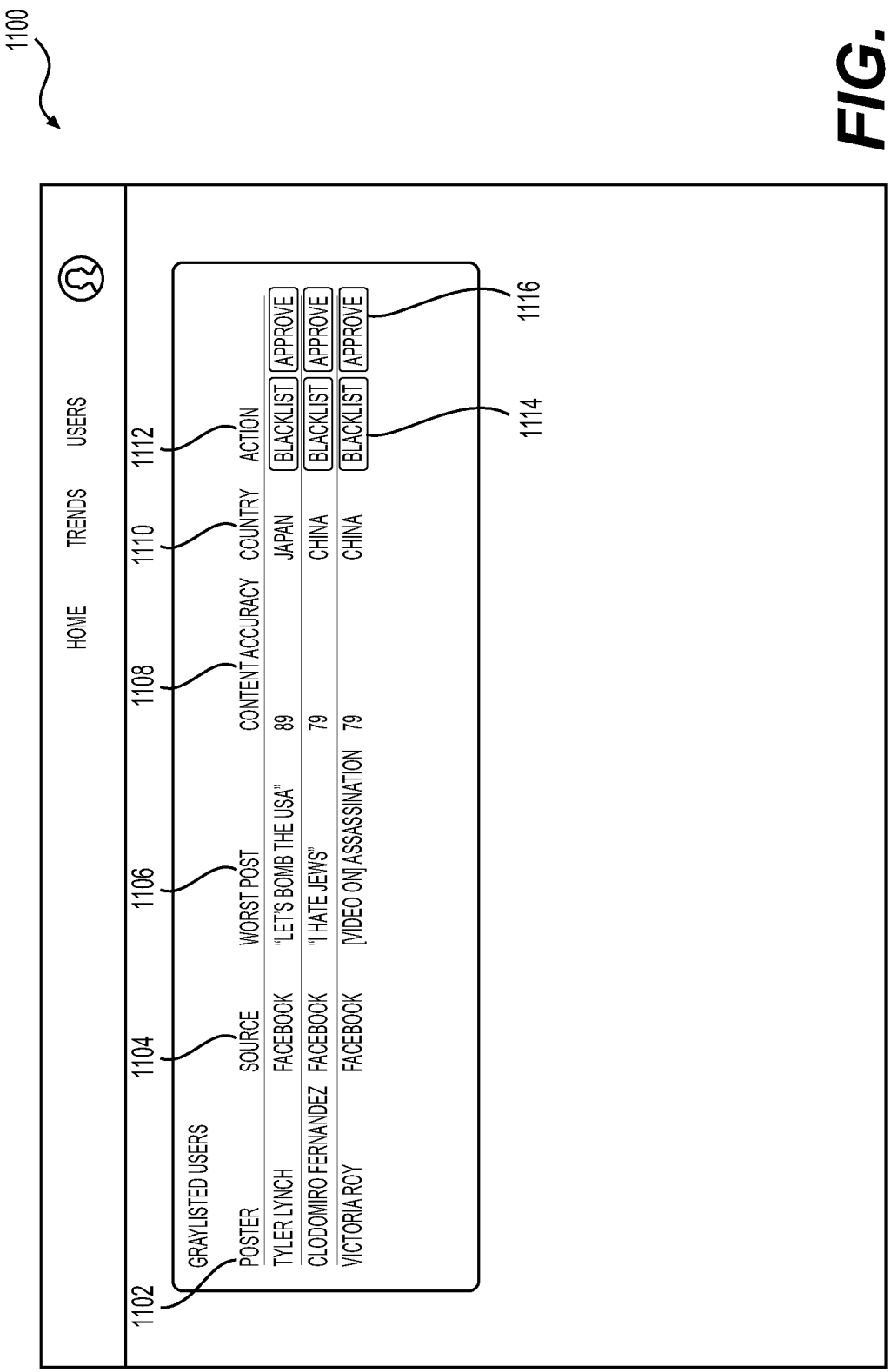
FIG. 11 shows a user dashboard that displays information regarding various users/posters in accordance with the examples disclosed herein.

FIG. 11 shows a user dashboard 1100 that displays information regarding various users/posters 1102, the pertinent social network from which the user/poster information is extracted 1104, the worst post 1106, accuracy in content detection 1108 and the country of posting 1110. In an example, the users may be gray listed if the risk profile scores of the users are above a profile score threshold. In addition, the action buttons 1112 enable different actions that are recommended for executing on the users. The action buttons 1112 enable an administrative user to blacklist 1114 the users or to approve 1116 the users if the risk profile score does not warrant blacklisting. The content posted by the users in the gray list can be quarantined for review prior to being posted on the social network. If the approve 1116 button is pressed for a user, the user can be removed from the gray listed users and the alert regarding the user may not be transmitted to the social network.

In an example, the user dashboard 1100 associated with the monitoring system 100 may not include the action buttons 1112. Another version of the user dashboard 1100 with the action buttons 1112 can be hosted on each of the plurality of social networks 150 so that the corresponding social networks can take action on the bad actors based on the recommendations from the monitoring system 100 subject to the individual content thresholds of each of the plurality of social networks 150.

FIG. 12 shows a sample dataset 1200 generated by the monitoring system 100 in accordance with the examples disclosed herein. The dataset 1200 includes various columns including the user ids 1202, primary post content 1204, date/time of the posts 1206, the post category or post topic 1208, post sentiment 1210, action type 1212 of the secondary messages associated with a primary post on bullying, the content of the secondary posts 1214 if any that accompany the action, the action sentiment 1216 (or the sentiment extracted from the secondary messages) and the scores 1218 computed for the messages. A parent message id 1220 enables identifying a primary post and the secondary messages responding to the primary post. In the example dataset depicted in FIG. 12, all the messages carry the same parent post id which indicates that all the messages being analyzed belong to a single message chain.

FIG. 13 illustrates a computer system 1300 that may be used to implement the monitoring system 100. More particularly, computing machines such as desktops, laptops, smartphones, tablets and wearables which may be used to generate or access the data from the monitoring system 100 may have the structure of the computer system 1300. The computer system 1300 may include additional components not shown and that some of the process components described may be removed and/or modified. In another example, a computer system 1300 can sit on external-cloud platforms such as, Amazon Web Services, AZURE® cloud or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306. Each of these components may be operatively coupled to a bus 1308. The computer-readable medium 1306 may be any suitable medium which participates in providing instructions to the processor(s) 1302 for execution. For example, the processor-readable medium 1306 may be non-transitory or non-volatile medium, such as a magnetic disk or solid-state non-volatile memory or volatile medium such as RAM. The instructions or modules stored on the processor-readable medium 1306 may include machine-readable instructions 1364 executed by the processor(s) 1302 that cause the processor(s) 1302 to perform the methods and functions of the monitoring system 100.

The monitoring system 100 may be implemented as software stored on a non-transitory processor-readable medium and executed by the one or more processors 1302. For example, the processor-readable medium 1306 may store an operating system 1362, such as MAC OS, MS WINDOWS, UNIX, or LINUX, and code 1364 for the monitoring system 100. The operating system 1362 may be multi-user, multiprocessing, multitasking, multithreading, real-time and the like. For example, during runtime, the operating system 1362 is running and the code for the monitoring system 100 executed by the processor(s) 1302.

The computer system 1300 may include a data storage 1310, which may include non-volatile data storage. The data storage 1310 stores any data used by the monitoring system 100. The data storage 1310 may be used to store the messages 172, the metadata 174, the various keywords 176, the risk profile scores 162, etc., generated by the monitoring system 100.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A social network data processing and profiling system comprising:
    at least one processor;
    a non-transitory processor readable medium storing machine-readable instruction that cause the processor to:
    receive messages and metadata of the messages posted to at least one social network, the messages include primary messages and responses to the primary messages included in a message chain with the primary messages wherein each of the responses constitutes an action and wherein the metadata includes identities of users posting the messages to the social network;
    obtain one or more keywords from the messages using content processing techniques;
    categorize the messages into at least one category of a plurality of categories based on the keywords, wherein the plurality of categories include a miscellaneous category for categorizing messages that cannot be categorized into any other categories of the plurality of categories and one or more of the messages are categorized into the miscellaneous category;
    extract sentiments expressed in the messages using a sentiment analyzer;
    determine a score for each of the messages, wherein the scores for the messages are based on respective content of the messages, the sentiments expressed in each of the messages with respect to corresponding category and the action corresponding to the message if the message is a response to a primary post;
    identify at least one of the messages categorized into one of the plurality of categories other than the miscellaneous category and the at least one message does not comply with at least one rule associated with a corresponding category of the at least one message;
        retrieve identity of a user posting the at least one message that does not comply with at least one rule associated with the corresponding category of the at least one message; and
        increase a risk profile score of the user based on a score of the at least one message; and
    identify the one or more messages that are categorized into the miscellaneous category and having similar keywords;
    determine that a number of the one or more messages in the miscellaneous category having the similar keywords exceed a predetermined threshold;
    categorize the one or more messages having the similar keywords in the miscellaneous category under a new trend not included in the plurality of categories wherein the new trend does not correspond to at least one rule employed for processing the messages; and
        flag the one or more messages categorized under the new trend for further review.

2. The social network data processing and profiling system of claim 1, wherein in order to categorize the messages, the processor is to:
    categorize the messages into one of the plurality of categories by employing a trained content categorizer based on multi-class logistic regression.

3. The social network data processing and profiling system of claim 1, wherein the at least one message that does not comply with the at least one rule associated with the corresponding category of the at least one message includes a response to a primary message posted by another user.

4. The social network data processing and profiling system of claim 3, wherein in order to determine that the at least one message does not comply with the at least one rule associated with the corresponding category of the at least one message, the processor is to:
    categorize the primary message into the corresponding category of the plurality of categories other than the miscellaneous category;
    extract a sentiment expressed in the primary message for the corresponding category; and
    score the at least one message based on a combination of the sentiment expressed in the primary message for the corresponding category and the sentiment expressed in the at least one message for the primary message.

5. The social network data processing and profiling system of claim 3, the non-transitory processor readable medium storing further machine-readable instruction that cause the processor to:
    determine if the risk profile score of the user is above a profile score threshold; and
    recommend quarantining content posted by the user to the social network.

6. The social network data processing and profiling system of claim 1, wherein in order to extract the sentiment from the messages, the processor is to:
    employ the sentiment analyzer that is based on multi-class neural network, wherein the sentiment analyzer is trained on training data having training messages explicitly labelled with the sentiments.

7. The social network data processing and profiling system of claim 1, wherein the messages include encrypted image and video data.

8. The social network data processing and profiling system of claim 1, wherein in order to obtain the keywords from the content, the processor is to:
    parse, tokenize textual content associated with the messages; and
    tag the tokens generated from the messages with parts-of-speech data.

9. The social network data processing and profiling system of claim 1, wherein in order to retrieve identity of a user posting the at least one message, the processor is to:
    retrieve an encrypted user id received from the social network.

10. The social network data processing and profiling system of claim 1, the non-transitory processor readable medium storing further machine-readable instruction that cause the processor to:
retrieve geolocation metadata of the one or more messages categorized into the miscellaneous category when the number of the one or more messages exceeds the predetermined threshold.

11. The social network data processing and profiling system of claim 10, the non-transitory processor readable medium storing further machine-readable instruction that cause the processor to:
enable generation of a trend heat map graphical user interface that provides a map showing geographical locations associated with the one or more messages.

12. A method of processing social network data comprising:
accessing messages and metadata of a plurality of messages that are posted to a plurality of social networks, wherein the messages include primary messages and responses to the primary messages wherein each of the responses constitutes a corresponding action;
obtaining one or more keywords from the messages using content processing techniques;
categorizing the messages into at least one category of a plurality of categories by a content categorizer based on the keywords, wherein the plurality of categories include a miscellaneous category for categorizing messages that cannot be categorized into any other categories of the plurality of categories;
identifying one or more of the messages that are categorized into the miscellaneous category and having similar keywords;
determining that a number of the one or more messages classified into the miscellaneous category having the similar keywords exceed a predetermined threshold;
categorizing the one or more messages having the similar keywords in the miscellaneous category under a new trend not included in the plurality of categories wherein the new trend does not correspond to at least one of one or more rules employed for processing the messages;
extracting sentiments expressed in the messages using a sentiment analyzer;
identifying primary messages of message chains in the plurality of messages;
generating scores for the primary messages based on the one or more rules wherein the scores are whole numbers;
identifying secondary messages to the primary messages from the plurality of messages based on message ids obtained in the metadata;
generating scores for each of the secondary messages based at least on actions associated with the secondary message, wherein the primary messages are assigned higher scores than the secondary messages;
aggregating the scores for the primary and the secondary messages as risk profile scores in corresponding user accounts of users posting the messages; and
raising alerts for the messages classified under the new trend and when one or more of the risk profile scores exceed a profile score threshold.

13. The method of claim 12, wherein generating scores for the primary messages further comprises:
generating a corresponding one of the scores for each of the primary messages expressing a positive sentiment for the at least one category of the plurality of categories identified for the primary message.

14. The method of claim 12, wherein generating scores for the secondary messages further comprises:
generating the scores for the secondary messages based further on the sentiments expressed in the secondary messages for the primary messages and content of the secondary messages.

15. The method of claim 14, wherein generating scores for the secondary messages further comprises:
generating non-zero scores for the secondary messages when the secondary messages express positive sentiments for bad content categorized under one of the plurality of categories other than the miscellaneous category.

16. The method of claim 15, wherein generating scores for the secondary messages further comprises:
providing no score for the secondary messages when the secondary messages express one of negative sentiments or neutral sentiments for the bad content.

17. The method of claim 12, further comprising
obtaining encrypted user ids of the users posting the messages from the metadata.

18. A non-transitory processor-readable storage medium comprising machine-readable instructions that cause a processor to:
receive messages and metadata of the messages posted to at least one social network, the messages include primary messages and responses to the primary messages included in message chains initiated by the primary messages wherein each of the responses constitutes an action and wherein the metadata includes identities of users posting the messages to the social network;
obtain, from the at least one social network, one or more keywords extracted from the messages, corresponding categories associated with the messages, and sentiments expressed in the messages, the corresponding categories selected from a plurality of categories based on the keywords, wherein the plurality of categories include a miscellaneous category for categorizing messages that cannot be categorized into any of the other predetermined categories and wherein one or more of the messages are classified into the miscellaneous category;
determine a score for each of the messages, wherein the scores for each message is based on respective content of the message, the sentiments expressed in the message and the action corresponding to the message if the message is a secondary message posted in response to a primary message;
identify at least one of the messages that are categorized into one of the plurality of categories other than the miscellaneous category;
retrieve an identity of a user posting the at least one message that does not comply with at least one rule; and
increase a risk profile score of the user based on a score of the at least one message; and
identify the one or more messages that are categorized into the miscellaneous category and having similar keywords;
determine that a number of the one or more messages in the miscellaneous category having the similar keywords exceed a predetermined threshold; and
categorize the one or more messages having the similar keywords in the miscellaneous category under a new trend not included in the plurality of categories wherein the new trend does not correspond to at least one rule employed for processing the messages; and flag the one or more messages classified under the new trend for further review based at least on the corresponding categories and sentiments associated with the messages.

19. The non-transitory processor-readable storage medium of claim 18, wherein the instructions to determine a score for each of the messages further comprise instructions that cause the processor to:
assign higher positive scores to primary messages in the received messages and lower positive scores to secondary messages of the primary messages when the primary messages and the secondary messages include bad content.

20. The non-transitory processor-readable storage medium of claim 18, further comprising instructions that cause the processor to:
enable generation of a graphical user interface (GUI) that displays a social network of at least one user posting the bad content on the social network.

\* \* \* \* \*